June 18, 1957  R. L. ATKINSON  2,796,302
ENDLESS TRACKS FOR SELF-LAYING TRACK TYPE VEHICLES
Original Filed Jan. 11, 1954  2 Sheets-Sheet 1
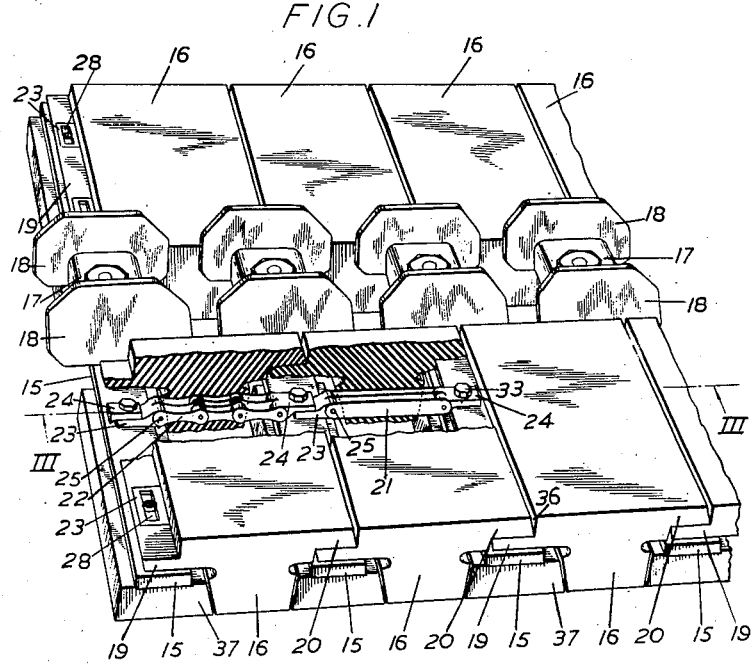
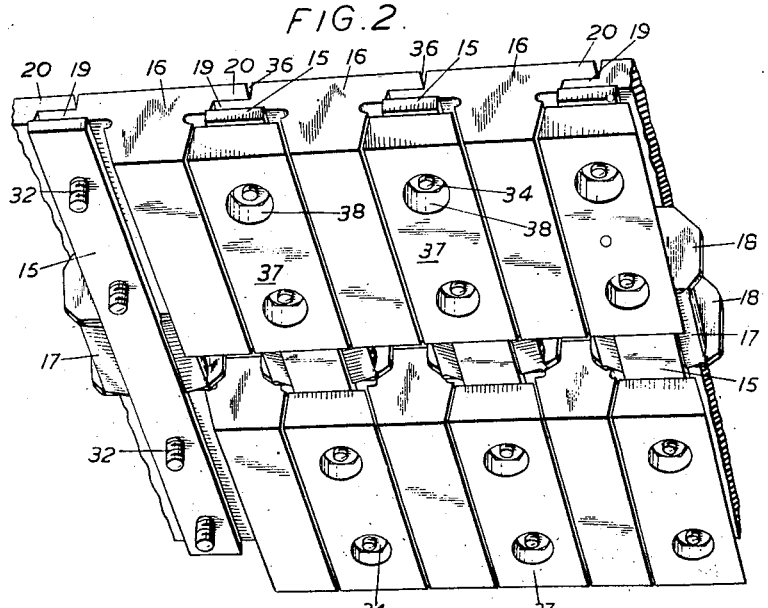
Inventor
Richard Leslie Atkinson
By David and Norman
His Attorneys June 18, 1957          R. L. ATKINSON          2,796,302
ENDLESS TRACKS FOR SELF-LAYING TRACK TYPE VEHICLES
Original Filed Jan. 11, 1954          2 Sheets-Sheet 2
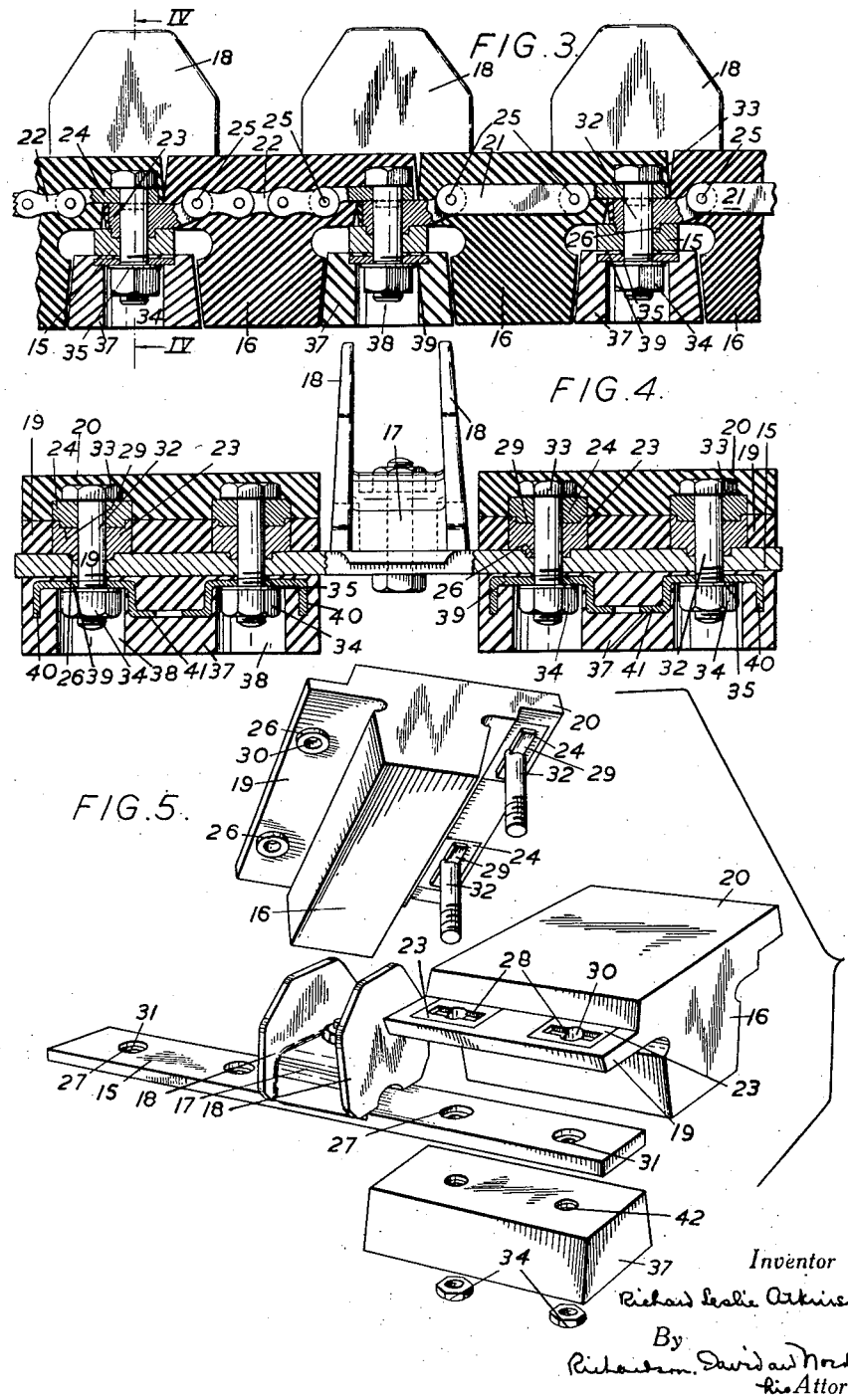

United States Patent Office 2,796,302
Patented June 18, 1957

2,796,302

ENDLESS TRACKS FOR SELF-LAYING TRACK TYPE VEHICLES

Richard L. Atkinson, Brookside, Read, near Burnley, England, assignor to Atkinson's Agricultural Appliances Limited, Clitheroe, England Original application January 11, 1954, Serial No. 403,351. Divided and this application June 15, 1955, Serial No. 515,700

Claims priority, application Great Britain September 11, 1953

17 Claims. (Cl. 305—10)

The present application is a division of my presently abandoned formerly co-pending application Serial Number 403,351 filed January 11, 1954, and is a continuation-in-part of my co-pending applications Serial Nos. 251,702 and 403,350 filed on October 17, 1951 and January 11, 1954, respectively, now respectively Patents No. 2,761,-744 and 2,761,745.

This invention relates to endless tracks for self-laying track vehicles, and more especially to endless tracks which comprise a series of transversely-extending, rigid track members or driving bars alternating in the longitudinal direction with one or more longitudinally-extending series of transversely-extending pads of rubber with flexible, non-extensible tension members embedded thereon, the rigid track members or track elements being interconnected with the pads by bolts through the medium of the tension members in the pads. The term "rubber" where used in this specification and in the claims appended thereto is to be construed as embracing natural and synthetic rubbers and other such tough, resilient, moisture-proof materials of a rubbery nature suitable for the purpose of the invention.

Provision has had to be made in endless tracks in general against the tendency of the track to slip in the lateral direction, and in endless tracks of the construction aforesaid, it has been proposed heretofore to prevent such lateral slip by providing co-operating formations on successive elements, which formations in the case of power-operated sprocket-driven tracks have taken the form of plate-like walls flanking the sprocket-engaging portion of track and projecting fore and aft of each rigid track element, the slip-preventing walls being joggled or offset in the longitudinal direction to nest one within the other successively.

In tracks of the construction aforesaid the bolts which secure the tension members to the rigid track members have heretofore been subjected to considerable shear stress in the running or longitudinal direction and it has been necessary to utilize bolts of relatively large diameter to withstand such stress for as long a running period as possible. Notwithstanding the provision per track element for each series of pads of two transverse series of bolts of considerable resistance to shear, shearing of the bolts has frequently occurred. This disadvantage has been offset to some extent in tracks of the construction aforesaid, as the bolts can be readily replaced.

An object of the present invention is to minimize shear stress on the bolts in tracks of the construction aforesaid, and to minimize any tendency toward lateral slip in such tracks.

The present invention involves an endless track comprising a series of transversely-extending rigid track members or driving bars, at least one series of longitudinally and transversely-extending, pads of rubber alternating in the longitudinal direction of the track with said driving bars and inter-linked with the latter through the medium of substantially non-extensible flexible tension members embedded in the pads to provide for relative hinging movement about at least one transverse axis between successive bars and pads, complementary interengaging means interlocking the end portions of the tension members together and with the driving bars against relative movement with respect to one another at least in the lateral direction and preferably also in the longitudinal direction of the track, and means securing the driving bars and tension members together in their assembled interlocked condition.

These interengaging interlocking end portions of the tension members constitute tension absorbing portions thereof which relieve the bolts or other fastening devices of the necessity of withstanding shear stresses during the running of the track. These tension absorbing portions engagingly connect the tension member end portions and one of the rigid track members together preventing relative movement thereamong in all directions parallel to the normally flat inner surfaces of the resilient pads without subjecting the bolts to stresses other than tensile stresses.

The pads of each series are arranged with the inner and outer end portions of each pad extending beyond the central portion of the pad at opposite ends thereof forming inner and outer flanges. The inner flange portion of each pad of the series overlaps the outer flange portion of one of the pads which is adjacent thereto. Correspondingly, the outer flange portion of each pad underlies and is overlapped by the inner flange portion of the other adjacent pad. The inner surfaces of the series of pads, including the inner surfaces of the inner flange portions, form at least one effectively smooth, continuous, resilient track surface for load supporting and guiding engagement with the bogie wheels of the vehicle. This smooth, resilient track surface or running lane is intermittently but insignificantly interrupted to provide smooth and continuous support for the bogie wheels on one side of a self-laying track vehicle, and a pair of guide elements are provided flanking each lane where it traverses each rigid bar, said guide elements extending inwardly beyond the surfaces of the bars and pads and presenting substantially vertical spaced guide faces towards the bogie wheels.

The guide elements may be integral with or otherwise made unitary with the bars and pads. The guide elements provided on the pads may conveniently be formed of rubber and be moulded with the pads. They may, moreover, be reinforced internally for example by metal inserts embedded in the rubber.

The guide elements serve to guide the track in a true rectilinear direction under the bogie wheels of a self-laying track vehicle and resist lateral displacement of the track from its true path even under adverse circumstances such as occur, for example, when a self-laying track vehicle makes an abrupt turn and the surface over which the vehicle is running is of a soft or sticky nature affording substantial adhesion to the track.

By virtue of the keying or interlocking of the interengaging end portions of the tension members and the rigid driving bars, the longitudinally-directed tensile stresses produced in the course of running of the track are transmitted through and absorbed by the interengaging end portions of the tension members and the track elements, the bolts thus being required to withstand only tensile stresses.

The tension members in the pads of each series may overlap one another successively over each successive driving bar and the end portions of the tension members at each overlapping region may advantageously be keyed together and to the driving bar, or interlocked with one another and with the driving bars, whereby a single transverse series of bolts may be utilized to interconnect the tension members of each successive pair of pads with each other and with the driving bars at each overlapping region.

The tension members may extend either over the inner or bogie-wheel-adjacent surfaces of the driving bars, or over the outer or bogie-wheel-remote surfaces thereof. In the former case the flexible tension members or pad reinforcements, save at the surface regions thereof providing keying or interlocking formations, are embedded in driving bar-overlapping parts of the pads, and in the latter case a plate preferably extends laterally across the surface of the tension member or pad reinforcement remote from each driving bar, being keyed to or interlocking with said surface and forming with the driving bar a box construction through which the reinforcements pass and within which they are locked by the interengaging keying or interlocking formations.

Alternatively the ends of the tension members of adjacent pads may abut one another and be sandwiched between the driving bar and a track plate co-operating therewith, the tension members or pad reinforcements at the abutting region being provided at the driving bar and plate-adjacent surfaces with projections and/or recesses co-operating with recesses and/or projections provided in and/or on the driving bar and plate, whereby the bolts have the sole function of holding the co-operating parts sandwiched together and the shear stresses set up in running of the track are transmitted through and absorbed by the driving bars, the plates and the tension members or pad reinforcements.

The forces set up in running the tracks of the present invention are therefore transmitted through and absorbed entirely by the tension members and the driving bars, and the plates where provided, and the bolts are stressed in tension only as their sole function is to interconnect the reinforcements with the driving bars, and the plates where provided.

Snaking or lateral slip of the track is also prevented by the construction of the present invention, and hence the drive-sprocket co-operating formations on the driving bars need not be complicated by plates designed to prevent lateral slip.

Certain preferred embodiments of the invention will now be described, by way of example, with reference to the accompanying drawings, in which:

Fig. 1 is a perspective view of a section of an endless track according to one embodiment of the invention looking on the inner or bogie-wheel-adjacent surface thereof, parts of two pad units being broken away to illustrate two different types of tension members or pad internal reinforcement;

Fig. 2 is a perspective view of a similar section of the track of Fig. 1 but looking on the outer or bogie-wheel-remote surface thereof;

Fig. 3 is an enlarged longitudinal section on the line III—III of Fig. 1;

Fig. 4 is a transverse section on the line IV—IV of Fig. 3, the central, drive-sprocket-engaging part of the driving bar being shown in elevation;

Fig. 5 is an exploded view of a driving bar, two adjacent pad units, and an intermediate pad illustrating the relationship of these parts in assembling the track of Figs. 1 to 4.

Referring to Figs. 1 to 5 of the drawings, the endless track comprises a series of transversely-extending, rigid, metal track members or driving bars 15 preferably but not necessarily extending across and defining the full width of the track and alternating in the longitudinal direction of the track with two longitudinal series of internally-reinforced ground-engaging pads 16 of rubber defining the depth of the track and spaced to each side of the track median plane, the rigid track members or elements being provided centrally intermediate the two series of pads with drive-sprocket-co-operating formations 17 each flanked by a pair of longitudinally-disposed, vertical guide plates 18.

The terms "inner" and "outer" and related terms used hereinafter in the present description are to be construed as defining the relative locations of parts of the track considering the track mounted about the bogie wheels and sprockets of a self-laying track vehicle and the inner surface of the track that over which the bogie wheels run.

The adjacent end portions of successive pads of each series overlap one another and fit together over a single rigid track member or track element, being interengagingly keyed to one another and to the track element in such overlapping position. Each pad 16 is provided with two complementary flanges 19 and 20 extending longitudinally of the track from the opposed ends of the pad, the inwardly-facing surface of the flanges 20 being a continuation of the inner surface of the central portion of the pad and the inwardly-facing surface of the flange 19 being below the plane of the inner surface of the pad a distance equivalent to the depth or thickness of the flange 20. Thus when the pads of the series are fitted together successively in the track the flanges 19 and 20 complement one another and the inwardly-facing surface of each flange 20 is level with and effectively forms a continuation of the inner surface of the central portion of the adjacent pad whose flange 19 it overlaps.

Each pad is internally reinforced by one or more longitudinally-extending flexible and substantial non-extensible tension members. In the track illustrated in Figs. 1 to 5 two such tension members or reinforcements are provided in each pad, being spaced laterally apart. Each reinforcement comprises a connector block embedded in each flange and each block is hingedly connected to one end of an interconnecting, pad-traversing, non-stretching reinforcement means which may comprise one or more longitudinally-extending links 21, for example three laterally-spaced links as illustrated, or a length of chain consisting of one or more links, for example a three-link length 22 of double-width roller chain as illustrated. Two complementary kinds of connector block are utilized, one kind 23 in the outer or track-element-contacting flanges 19, and the other kind 24 in the inner or track-element-remote flanges 20.

Each of the connector blocks 23 and 24 is hingedly interconnected with the central portion of the tension member or pad reinforcement means at 25, thereby imparting flexibility to the tension member, the block 23 being provided on its element-adjacent or outer surface with a projecting cylindrical boss 26 which engages in a corresponding cylindrical counterbore or recess 27 in the innermost surface of a rigid track member or element 15, and in its element-remote or inner surface with a rectangular keyway 28 which is engaged by a corresponding rectangular key 29 projecting from the outer surface of the connector block 24 embedded in the overlapping flange 20 of the adjacent pad 16. The keyway 28 and boss 26 are directly opposed to one another in each block 23.

Bolt holes 30 and 31 are provided in the blocks 23 and elements 15 respectively, said bolt holes extending centrally through the bosses 26 and recesses 27 respectively and being aligned when the bosses engage in the recesses. Bolt holes are also provided in the blocks 24 and these are aligned with the bolt holes 30 when the keys 29 engage in the keyways 28, the bolt holes in the blocks 24 being traversed by bolts 32 the heads 33 of which contact the innermost faces of the blocks 24 and are embedded in the flanges 20, being spaced outwardly from the inner surface of the flange portion of the pad. Thus in the assembly of the track (see Fig. 5) there is fitted into position on each rigid track element or driving bar 15, on each side of the central formation 17, 18 firstly a first pad 16 with its flange 19 overlapping the element and the bosses 26 engaging in the recesses 27, and secondly a second pad 16 with its flange 20 overlapping the flange 19 of the first pad and the keys 29 engaging in the keyways 28, the bolts depending from the flanges 20 extending through the bolt holes 30 and 31 to be locked in position on the outer face of the element by nuts 34 and preferably also washers 35. The connecting blocks 23 of the first pad 16 are keyed to or interlocked with the driving bar 15, and the overlying connecting blocks 24 of the second pad are keyed to or interlocked with the underlying connecting blocks 23 of the first pad, the bolts 32 being solely in tension as their sole burden is to hold the parts assembled in position against displacement in a direction normal to the surfaces of the driving bar 15, i. e. lengthwise of the bolts, the stresses which would tend to shear the bolts, and which are set up in running of the track, being transmitted through the driving bars and interengaging connecting blocks of the pad reinforcements. Further in the assembled track the inner surfaces of the pads of each series provide, on each side of the driving bar central, sprocket-cooperating formation 17, 18, a substantially continuous smooth and resilient track or running surface for twin-sets of bogie wheels of a self-laying track vehicle, which surface is locally but unobtrusively interrupted at each end of each pad. The end of each flange 20 is slightly angled to provide a series of interspaced transversely-disposed V-notches 36 along each running surface to allow for contraction in the longitudinal direction of such surfaces in the course of their passage around the drums flanking the sprockets.

The track illustrated is provided with two series of internally-reinforced outwardly-disposed ground-engaging rubber blocks 37. These need not, however, be provided but may in certain circumstances be advantageous. They may moreover, where expedient, be replaced by metal cleats or grousers, again dependent on certain circumstances, such as the nature of the terrain over which the vehicle may be required to run.

The outer ground-engaging blocks 37 are interspaced by the pads 16 and are located between successive pads, being mounted on the track elements or driving bars 15 by means of the bolts 32 and the nuts 34 and washers 35. In order to accommodate the nuts 34 and washers 35 each block 37 is provided with two appropriately positioned and dimensioned circular openings 38 of substantial depth to enable location of the nuts and the free ends of the bolts well clear of the ground. Each outer block 37 is reinforced internally by a metal plate 39 flanged at each end at 40 and offset centrally at 41. The plates 39 are located close to the inner surfaces of the blocks 37, the flanges 40 being close to the ends of the blocks, and the offset parts extending outwardly towards the ground-engaging surfaces of the blocks between the two openings 38. Bolt holes 42 for the bolts 32 are provided in the inner or track-element-adjacent surface of the blocks and extend through the plates 39.

In a modification of the embodiment described with reference to Figs. 1 to 5, the flanges 19 and 20 of the pads do not overlap one another, but instead abut one another substantially along the transverse centre lines of the rigid track members 15. Such an abutting arrangement is disclosed in detail in my Patents No. 2,761,744 and 2,761,745 referred to above. With this modification, both ends of each tension member will be provided with cylindrical bosses 27 and each bolt hole in the rigid track members 15 will be counterbored as at 27 for engagement with one of the bosses 27, an individual bolt hole 31 being provided for each end of each tension member. In this case, the pads do not overlap each other, but the ends of each pad substantially abut each other and the opposite ends of each tension member are directly connected to adjacent ones of the rigid track members 15, the slots and keys 28 and 29 being omitted.

I claim:

1. An elongated flexible track adapted to be formed into an endless self-laying ground engaging track for the support of a vehicle having a plurality of longitudinally spaced bogie wheels for load supporting and guiding engagement with said track, said track comprising: a series of transversely extending rigid track members each having inner and outer surfaces and parallel transversely extending edges; a series of aligned generally rectangular pads each formed of tough, resilient moisture-proof material and each having a normally flat inner surface and an outer surface, at least one end portion of each of said outer pad surfaces being engaged by one of said inner track member surfaces, each of said pads extending between two adjacent ones of said track members with the inner surfaces of said series of pads forming an effectively smooth continuous resilient track surface adapted for load supporting engagement with said bogie wheels; a flexible substantially non-extensible tension member embedded in each pad and extending longitudinally thereof intermediate the ends of said pad; and a plurality of detachable fastening means spaced outwardly of said normally flat inner surface of each pad and extending outwardly from within said pad and from at least one end portion of each tension member, said fastening means connecting said last-named end portion of said tension member to one of said two adjacent track members between which said pad extends, whereby any of said track members or said pads may be individually removed from said track and replaced therein, the end portions of each of said tension members comprising tension absorbing fastening means connecting said tension member with said rigid track members between which said pad extends, whereby said detachable fastening means are not required to withstand shear stresses which would otherwise accompany the running of said track.

2. An elongated flexible track adapted to be formed into an endless self-laying ground engaging track for the support of a vehicle having a plurality of longitudinally spaced bogie wheels for load supporting and guiding engagement with said track, said track comprising: a series of transversely extending rigid track members each having inner and outer surfaces and parallel transversely extending edges; a series of aligned generally rectangular pads each formed of tough, resilient moisture-proof material and each having a normally flat inner surface and an outer surface, at least one end portion of each of said outer pad surfaces being engaged by one of said inner track member surfaces, each of said pads extending between two adjacent ones of said track members with the inner surfaces of said series of pads forming an effectively smooth continuous resilient track surface adapted for load supporting engagement with said bogie wheels; a flexible substantially non-extensible tension member embedded in each pad and extending longitudinally thereof intermediate the ends of said pad, the end portions of said tension members in adjacent ones of said pads comprising tension absorbing portions which engagingly connect said tension member end portions and one of said track members together preventing relative movement thereamong in at least one direction parallel to said normally flat inner surfaces of said pads; and a plurality of detachable fastening means spaced outwardly of said normally flat inner surface of each pad and extending outwardly from within said pad and from at least one end portion of each tension member, each said fastening means connecting said last-named end portion of said tension member to at least one of said two adjacent track members between which said pad extends, whereby any of said track members or said pads may be individually removed from said track and replaced therein and said fastening means are not required to withstand shear stresses which would otherwise accompany the running of said track.

3. A track according to claim 2, in which said tension absorbing portions of said tension members interengage each other and prevent relative movement therebetween in all directions parallel to said normally flat inner pad surfaces, and wherein each of said rigid track members comprises means shaped for interlocking interengagement with one of said tension absorbing portions of one of said tension members and connecting said last-named tension absorbing portion therewith for preventing relative movement therebetween in all directions parallel to said normally flat inner pad surfaces, whereby said detachable fastening means is not required to withstand shear stresses in any direction.

4. A track according to claim 3, in which said detachable fastening means comprises bolt means which secure said interengaging tension absorbing portions of said tension members and one of said rigid track members assembled together for preventing said relative movement thereamong, said bolt means being stressed substantially solely in tension during the running of said track.

5. A track according to claim 2, in which the inner and outer end portions of each said pads of said series extend independently beyond the central portion of the pad at opposite ends thereof forming flanges, with the extending inner flange portion of one pad overlapping the extending outer flange portion of one of the pads adjacent to said pad and the extending outer flange portion at the opposite end of said pad underlying and being overlapped by the extending inner flange portion of the other pad adjacent to said pad.

6. A track according to claim 5, wherein said tension absorbing portions of said tension members are at least partially embedded in said flange portions of said pad, portions thereof being left free for permitting said engaging connection.

7. A track according to claim 2, in which said tension absorbing portions of said end portions of said tension members comprise interengaging complementary slot and key formations.

8. A track according to claim 2, in which the inner and outer end portions of each of said pads of said series extend independently beyond the central portion of the pad at opposite ends thereof forming flanges, the extending inner flange portion of one pad overlying the extending outer flange portion of one of the pads adjacent to said pad and the extending outer flange portion at the opposite end of said pad underlying the extending flange portion of the other pad adjacent to said pad, and wherein said detachable fastening means comprises a bolt the head portion of which is embedded in one of said overlying flange portions and spaced outwardly from the inner surface of said pad, said bolt being connected to one end portion of a tension member embedded in the pad in which the head portion of said bolt is embedded, said bolt extending outwardly from within said overlying flange portion and through said underlying flange portion, said bolt maintaining said tension absorbing end portions of said tension members secured in said engagingly connected relationship with respect to each other and said track member.

9. A track according to claim 8, in which said tension absorbing portions of said tension members comprise complementary interengaging end portions of each tension member in adjacent ones of said pads, said interengaging end portions preventing relative movement therebetween independently of said bolt in all directions parallel to said normally flat inner surfaces of said adjacent pads, one of said interengaging end portions being disposed at least partially embedded in one of said overlying flange portions and the other being disposed at least partially embedded in one of said underlying flange portions, and wherein said track member and said tension member end portion disposed in said underlying flange portion both comprise complementary interengaging portions disposed in proximity to the portion of said bolt which passes therethrough, said last-named interengaging portions preventing relative movement therebetween independently of said bolt in all directions parallel to said normally flat inner surfaces of said adjacent pads, whereby said tension absorbing portions engagingly connect said tension member end portions and said track member together preventing relative movement thereamong.

10. An elongated flexible track adapted to be formed into an endless self-laying ground engaging track for the support of a vehicle having a plurality of longitudinally spaced bogie wheels for load supporting and guiding engagement with said track, said track comprising: a series of transversely extending rigid track members each having inner and outer surfaces and parallel transversely extending edges; a series of aligned generally rectangular pads each formed of tough resilient moisture-proof material and each having a normally flat inner surface and an outer surface, said outer pad surfaces being engaged by said inner track member surfaces, each of said pads extending between two adjacent ones of said track members, the inner and outer end portions of each of said pads extending beyond the central portion of the pad at opposite ends thereof forming flanges, the extending inner flange portion of each of said pads overlapping the outer flange portion of one of the pads adjacent thereto and the extending outer flange portion of each pad underlying and being overlapped by the inner flange portion of the other of the pads adjacent thereto, whereby the inner surfaces of said series of pads including the inner surfaces of said inner flange portions thereof form an effectively smooth continuous resilient track surface adapted for load supporting engagement with said bogie wheels; a flexible substantially non-extensible tension member embedded in each pad and extending longitudinally thereof intermediate the ends of said pad; and a plurality of detachable fastening means spaced outwardly of said normally flat inner surface of the inner flange portion of each pad and extending outwardly from within said inner flange portion and through the outer flange portion of the adjacent pad which is overlaped by said inner flange portion, said fastening means connecting the adjacent end portions of the tension members in said adjacent pads together and to one of said track members, whereby any of said track members or said pads may be individually removed from said track and replaced therein.

11. An elongated flexible track adapted to be formed into an endless self-laying ground engaging track for the support of a vehicle having longitudinally spaced bogie wheels for load supporting and guiding engagement with said track, said track comprising: a series of longitudinally spaced transversely extending rigid track members; a series of pad members each formed of tough resilient material and each extending between two adjacent ones of said rigid track members, each of said pad members being engageable by said wheels; an elongated flexible substantially non-extensible tension member imbedded in each pad member, each tension member comprising end portions disposed for connection to the two track members between which said pad extends and at least one elongated fastening device extending through and connecting each of said end portions to a track member, said track member and said end portions comprising directly interengaging portions having cooperating surfaces which extend substantially parallel to the longitudinal axis of said fastening device for transmitting tensile forces directly thereamong and for preventing transmission to said fastening device of forces having components directed normally with respect to said longitudinal axis, whereby said fastening device is stressed effectively only in tension and is not appreciably stressed in shear.

12. An elongated flexible track adapted to be formed into an endless self-laying ground engaging track for the support of a vehicle having longitudinally spaced bogie wheels for load supporting and guiding engagement with said track, said track comprising: a series of longitudinally spaced transversely extending rigid track members; a series of pad members formed of tough resilient material, each of said pad members being engageable by said wheels and comprising a portion extending between two adjacent ones of said rigid track members, at least one elongated substantially non-extensible tension member embedded in each of said pad members, each tension member comprising terminal portions for transmitting tensile stresses to said adjacent rigid track members and to the terminal portions of the tension members embedded in the adjacent pad members of said series, fastening means connecting said terminal portions to each rigid track member, and interengaging tension transmitting surfaces formed on each of said terminal portions and on each of said rigid track members for transmitting said tensile stresses thereamong, said interengaging surfaces being independent of said fastening means with respect to said tensile stresses, whereby said fastening means are not subjected to shearing stresses.

13. A track according to claim 12, in which one of the terminal portions of each tension member overlies the corresponding underlying other terminal portion of the tension member embedded in an adjacent block of said series, and wherein said fastening means comprises a bolt passing through said overlying and underlying terminal portions and into one of said rigid track members, said tension transmitting surfaces being parallel to the longitudinal axis of said bolt.

14. A track according to claim 13, wherein said terminal portions comprise cooperating bars and slots extending diametrically from opposite sides of said bolt, said interengaging tension transmitting surfaces comprising confronting surfaces formed on said bars and slots.

15. A track according to claim 13, wherein each underlying terminal portion has a circular boss formed thereon through which said bolt passes, and in which each rigid track member has a counterbore formed therein in which said boss is received, said interengaging tension transmitting surfaces comprising confronting lateral surfaces of said boss and said counterbore.

16. A track according to claim 13, in which said terminal portions are imbedded in correspondingly overlying and underlying portions of said pad members.

17. A track according to claim 12, wherein said fastening means is a bolt which passes individually through one of said terminal portions and into one of said rigid track members, said terminal portion having a circular boss formed thereon, said bolt passing centrally through said boss, and in which each rigid track member has at least two counterbores formed therein in each of which one of said bosses is independently received, said interengaging tension transmitting surfaces comprising confronting lateral surfaces of each boss and counterbore.

No references cited.